(12) United States Patent
Kusuyama et al.

(10) Patent No.: US 12,394,574 B2
(45) Date of Patent: Aug. 19, 2025

(54) CAPACITOR ARRAY

(71) Applicant: Murata Manufacturing Co., Ltd., Nagaokakyo (JP)

(72) Inventors: Takafumi Kusuyama, Nagaokakyo (JP); Hiroshi Kikuchi, Nagaokakyo (JP); Masanori Yoshikawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 215 days.

(21) Appl. No.: 18/069,334

(22) Filed: Dec. 21, 2022

(65) Prior Publication Data
US 2023/0120573 A1 Apr. 20, 2023

Related U.S. Application Data

(63) Continuation of application No. PCT/JP2022/011855, filed on Mar. 16, 2022.

(30) Foreign Application Priority Data

Jun. 16, 2021 (JP) ................................ 2021-100336

(51) Int. Cl.
*H01G 9/26* (2006.01)
*H01G 9/048* (2006.01)
*H01G 9/07* (2006.01)

(52) U.S. Cl.
CPC ............... *H01G 9/26* (2013.01); *H01G 9/048* (2013.01); *H01G 9/07* (2013.01)

(58) Field of Classification Search
CPC ............. H01G 9/26; H01G 9/048; H01G 9/07
(Continued)

(56) References Cited

U.S. PATENT DOCUMENTS

| 2004/0125543 A1* | 7/2004 | Hirano | ................... | H05K 1/186 |
| | | | | 361/523 |
| 2008/0232027 A1* | 9/2008 | Ozawa | ..................... | H01G 9/14 |
| | | | | 361/311 |

(Continued)

FOREIGN PATENT DOCUMENTS

| JP | H02301118 A | 12/1990 |
| JP | 2002299159 A | 10/2002 |

(Continued)

OTHER PUBLICATIONS

International Search Report in PCT/JP2022/011855, mailed Jun. 7, 2022, 3 pages.

*Primary Examiner* — Arun Ramaswamy
(74) *Attorney, Agent, or Firm* — ArentFox Schiff LLP (57) ABSTRACT

The capacitor array that includes: a capacitor layer including a plurality of capacitor portions divided by a plurality of through-portions and arranged in a plane, and the capacitor portions each have a first main surface and a second main surface that are opposite to each other in a thickness direction. The plurality of through-portions include a first through-portion extending in a first direction perpendicular to the thickness direction, and a second through-portion extending in a second direction perpendicular to the thickness direction and intersecting the first direction. In a sectional view, each of the first through-portion and the second through-portion independently has a taper having a width decreasing from one of the first main surface and the second main surface to the other main surface. The first through-portion has a taper angle that is different from a taper angle of the second through-portion.

11 Claims, 6 Drawing Sheets

(58) Field of Classification Search
USPC .................................................. 361/500, 523
See application file for complete search history.

(56) References Cited

U.S. PATENT DOCUMENTS

| | | | | |
|---|---|---|---|---|
| 2013/0249075 A1* | 9/2013 | Tateiwa | .................. | H01L 24/82 |
| | | | | 257/734 |
| 2019/0228915 A1* | 7/2019 | Furukawa | .............. | H01G 9/048 |
| 2019/0362904 A1* | 11/2019 | Furukawa | ................ | H01G 9/04 |
| 2020/0312576 A1 | 10/2020 | Furukawa | | |

FOREIGN PATENT DOCUMENTS

| | | | |
|---|---|---|---|
| JP | 2006173441 A | 6/2006 |
| JP | 2010171304 A | 8/2010 |
| JP | 2010183047 A | 8/2010 |
| JP | 2020167361 A | 10/2020 |

* cited by examiner

CAPACITOR ARRAY

CROSS REFERENCE TO RELATED APPLICATIONS

The present application is a continuation of International application No. PCT/JP2022/011855, filed Mar. 16, 2022, which claims priority to Japanese Patent Application No. 2021-100336, filed Jun. 16, 2021, the entire contents of each of which are incorporated herein by reference.

FIELD OF THE INVENTION

The present invention relates to a capacitor array.

BACKGROUND OF THE INVENTION

A capacitor array or an array of capacitor portions has been studied in these years to be used as a substrate on which electronic components are mounted.

Patent Document 1 discloses a method for manufacturing a substrate with built-in components, as a method for manufacturing a capacitor array. The method includes, forming, in advance before forming a solid electrolytic capacitor on a chemically treated aluminum foil sheet, a separation groove in one surface of chemically treated aluminum foil through dry machining with, for example, a laser machine or a die set, forming a protective insulating material on the same surface as a sheet reinforcement and then forming a solid electrolytic capacitor, polishing the chemically treated aluminum foil from the back surface until the bottom of the groove is exposed, and forming the solid electrolytic capacitor and a wiring pattern electrically separated from each other on the chemically treated aluminum foil sheet.

Patent Document 1: Japanese Unexamined Patent Application Publication No. 2010-171304

SUMMARY OF THE INVENTION

As described in FIG. 1(b) in Patent Document 1, the method for manufacturing a substrate with built-in components described in Patent Document 1 includes formation of a non-through separation groove in the chemically treated aluminum foil. However, when a laser machine is used to form the separation groove in the chemically treated aluminum foil, the laser machine may fail to restrict the separation groove to the depth with which the separation groove does not extend through the chemically treated aluminum foil.

The method for manufacturing a substrate with built-in components described in Patent Document 1 includes, as illustrated in FIG. 1(c) in Patent Document 1, formation of a protective insulating material in the separation groove after the separation groove is formed in the chemically treated aluminum foil. The method for manufacturing a substrate with built-in components in Patent Document 1 describes that the protective insulating material prevents separation or dropping of the chemically treated aluminum foil. However, the protective insulating material formed with the method for manufacturing a substrate with built-in components described in Patent Document 1 is insufficient to hold the chemically treated aluminum foil without separation or dropping. Thus, the chemically treated aluminum foil may be separated or dropped in a downstream process to lower the handleability, or the chemically treated aluminum foil may have low processability due to constraints such as a failure in processing with a strong force.

The present invention is made in view of the above problem, and aims to provide a capacitor array having high handleability and processability during manufacture.

The present invention provides a capacitor array that includes a capacitor layer including a plurality of capacitor portions divided by a plurality of through-portions and arranged in a plane. The capacitor portions each include a first electrode, a second electrode, and a dielectric layer between the first electrode and the second electrode, and each of the capacitor portions having a first main surface and a second main surface that are opposite to each other in a thickness direction thereof. The plurality of through-portions include a first through-portion extending in a first direction perpendicular to the thickness direction, and a second through-portion extending in a second direction perpendicular to the thickness direction and intersecting the first direction. In a sectional view taken in the thickness direction, the first through-portion has a first taper that has a first width decreasing from one of the first main surface of the capacitor portion and the second main surface of the capacitor portion to another one of the first main surface and the second main surface, and the second through-portion has a second taper that has a second width decreasing from one of the first main surface of the capacitor portion and the second main surface of the capacitor portion to another one of the first main surface and the second main surface. The first taper has a first taper angle that is different from a second taper angle of the second taper.

According to the present invention, a capacitor array having high handleability and processability during manufacture can be provided.

DETAILED DESCRIPTION OF THE PREFERRED EMBODIMENTS

A capacitor array according to the present invention will be described below. The present invention is not limited to the structure described below, and may be changed as appropriate within the scope not departing from the gist of the present invention. One or more combinations of any two or more preferable components described below are also included in the present invention.

A capacitor array according to the present invention includes a capacitor layer including multiple capacitor portions divided by multiple through-portions and arranged in a plane.

Figure 1:
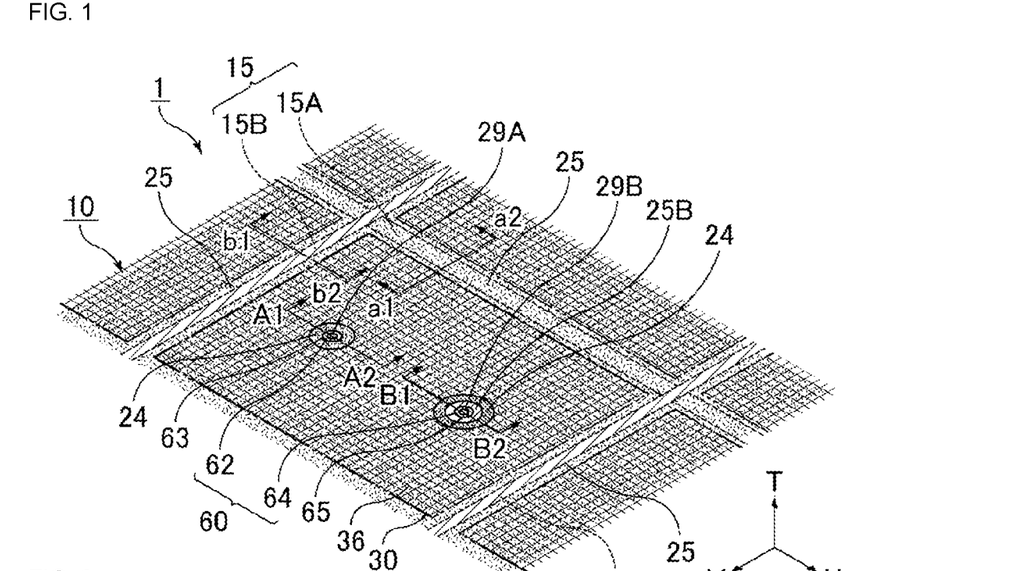
FIG. 1 is a schematic perspective view of an example of a capacitor array according to the present invention.

FIG. 1 is a schematic perspective view of an example of a capacitor array according to the present invention.

A capacitor array 1 illustrated in FIG. 1 includes a capacitor layer 10.

The capacitor layer 10 includes multiple capacitor portions 30.

The multiple capacitor portions 30 are divided by multiple through-portions 15 and arranged in a plane.

The number of the capacitor portions 30 is not limited in particular provided there are two or more capacitor portions 30.

The multiple capacitor portions 30 may be arranged linearly or in a plane. The multiple capacitor portions 30 may be arranged regularly or irregularly. All the multiple capacitor portions 30 may have, for example, the same size and two-dimensional shape or all or some of the multiple capacitor portions 30 may have, for example, different sizes and two-dimensional shapes.

The capacitor layer 10 may include the two or more different capacitor portions 30 with different areas.

The capacitor layer 10 may include the capacitor portions 30 with a two-dimensional shape other than a rectangle. Herein, rectangles include regular squares and rectangles. The capacitor layer 10 may include the capacitor portions 30 with a two-dimensional shape of, for example, a polygon such as, a triangle, a pentagon, a hexagon, and a quadrangle other than a rectangle. The capacitor layer 10 may further include the capacitor portions 30 with a two-dimensional shape of, for example, a shape having a curve, a circle, and an ellipse. In this case, the capacitor layer 10 may include the two or more different capacitor portions 30 with different two-dimensional shapes. In addition to the capacitor portions 30 with a two-dimensional shape other than a rectangle, the capacitor layer 10 may include or exclude the capacitor portions 30 with a two-dimensional shape of a rectangle.

In the capacitor array according to the present invention, each of the capacitor portions includes a first electrode, a second electrode, and a dielectric layer disposed between the first electrode and the second electrode, and has a first main surface and a second main surface opposite to each other in the thickness direction.

In the capacitor array according to the present invention, the first electrode may be an anode plate including a porous layer on at least one main surface, the dielectric layer may be disposed over the surface of the porous layer, and the second electrode may be a cathode layer disposed over the surface of the dielectric layer. In this case, the capacitor portion constitutes an electrolytic capacitor. An example of the capacitor array according to the present invention where each capacitor portion constitutes an electrolytic capacitor will be described below.

Figure 2:
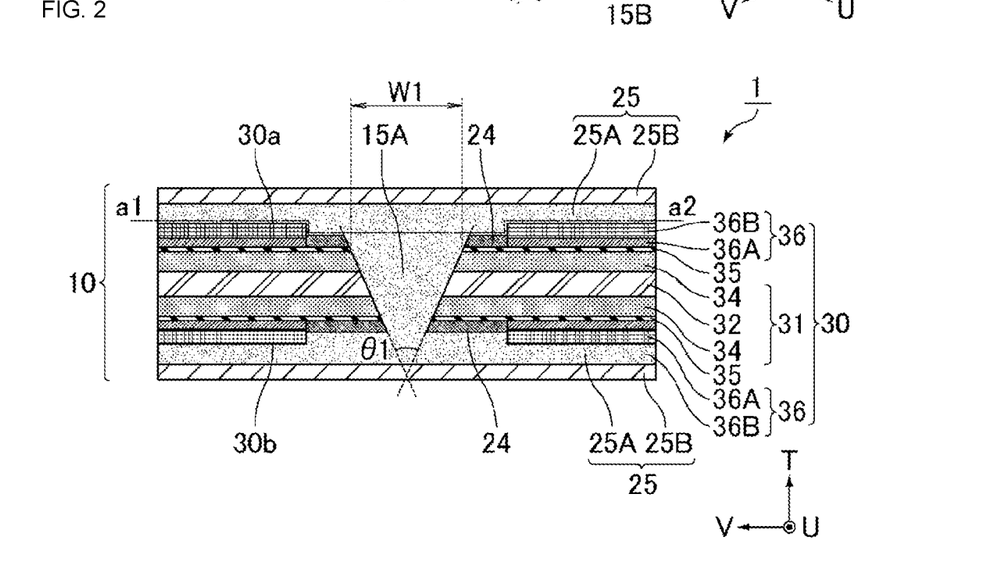
FIG. 2 is a schematic sectional view of an example of a cross section of the capacitor array including a cross section taken along line segment a1-a2 in FIG. 1.

FIG. 2 is a schematic sectional view of an example of a cross section of the capacitor array including a cross section taken along line segment a1-a2 in FIG. 1. Line segment a1-a2 in FIG. 2 corresponds to line segment a1-a2 in FIG. 1.

Figure 3:
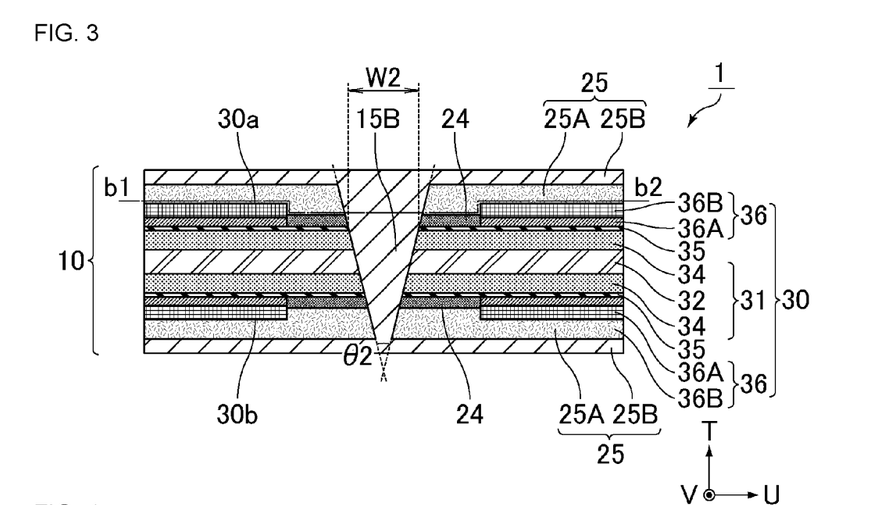
FIG. 3 is a schematic sectional view of an example of a cross section of the capacitor array including a cross section taken along line segment b1-b2 in FIG. 1.

FIG. 3 is a schematic sectional view of an example of a cross section of the capacitor array including a cross section taken along line segment b1-b2 in FIG. 1. Line segment b1-b2 in FIG. 3 corresponds to line segment b1-b2 in FIG. 1.

As illustrated in FIG. 2 and FIG. 3, each of the capacitor portions 30 includes an anode plate (first electrode) 31, dielectric layers 35, and cathode layers (second electrodes) 36.

The anode plate 31 includes a core 32 and porous layers 34.

The core 32 is preferably formed from a metal, or more preferably, a valve metal.

Examples of valve metals include pure metals such as aluminum, tantalum, niobium, titanium, and zirconium, and alloys containing at least one of these pure metals. Among these, aluminum or an aluminum alloy is particularly preferable.

At least one main surface of the core 32 receives the corresponding porous layer 34. In other words, the porous layer 34 may be disposed simply over one main surface of the core 32, or may be disposed over each of the main surfaces of the core 32, as illustrated in FIG. 2 and FIG. 3. Thus, the anode plate 31 includes the porous layer 34 on at least one main surface.

The porous layer 34 is preferably an etching layer formed by etching the surface of the anode plate 31.

The anode plate 31 preferably has a flat plate shape, or more preferably a foil shape. Herein, "plate shape" includes a "foil shape".

Each dielectric layer 35 is disposed over the surface of the corresponding porous layer 34.

Each dielectric layer 35 is preferably formed from an oxide film of the valve metal described above. For example, when the anode plate 31 that is aluminum foil undergoes anodic oxidation (also referred to as a chemical conversion treatment) in a solution containing, for example, ammonium adipate, an oxide film forming the dielectric layer 35 is formed. The dielectric layer 35 is disposed over the surface of the corresponding porous layer 34, and thus the dielectric layer 35 has pores (recesses).

Each cathode layer 36 is disposed over the surface of the corresponding dielectric layer 35.

As illustrated in FIG. 2 and FIG. 3, each cathode layer 36 preferably includes a solid electrolytic layer 36A disposed over the surface of the dielectric layer 35, and a conductor layer 36B disposed over the surface of the solid electrolytic layer 36A.

Examples of the material of the solid electrolytic layer 36A include electroconductive polymers such as polypyrrole, polythiophenes, and polyaniline. Among these, polythiophenes are preferable, and poly(3,4-ethylenedioxythiophene) (PEDOT) is particularly preferable. The electroconductive polymers may contain a dopant such as polystyrene sulfonate (PSS).

The solid electrolytic layer 36A preferably includes an internal layer that fills the pores (recesses) in the dielectric layer 35, and an external layer covering the surface of the dielectric layer 35.

The conductor layer 36B preferably includes at least one of a conductive resin layer and a metal layer. In other words, the conductor layer 36B may include the conductive resin layer alone, the metal layer alone, or both the conductive resin layer and the metal layer.

Examples of the conductive resin layer include a conductive adhesive layer containing at least one conductive filler selected from the group consisting of a silver filler, a copper filler, a nickel filler, and a carbon filler.

Examples of the metal layer include a metal-plated film and metal foil. The metal layer is preferably formed from at least one metal selected from the group consisting of nickel, copper, silver, and an alloy containing at least one of these metals as a main component.

Herein, the main component refers to the element having the maximum rate in weight.

The conductor layer 36B may include, for example, a carbon layer disposed over the surface of the solid electrolytic layer 36A, and a copper layer disposed over the surface of the carbon layer.

The carbon layer is formed in a predetermined region by, for example, applying carbon paste on the surface of the solid electrolytic layer 36A through, for example, sponge transfer, screen printing, dispenser application, or inkjet printing.

The copper layer is formed in a predetermined region by applying copper paste on the surface of the carbon layer through, for example, sponge transfer, screen printing, spray coating, dispenser application, or inkjet printing.

As described above, the capacitor portion 30 illustrated in FIG. 2 and FIG. 3 includes the anode plate 31 having main surfaces at least one of which is composed of the porous layer 34, the dielectric layer 35 disposed over the surface of the corresponding porous layer 34, and the cathode layer 36 disposed over the surface of the corresponding dielectric layer 35. Thus, the capacitor portion 30 constitutes an electrolytic capacitor. When each cathode layer 36 includes the solid electrolytic layer 36A, the capacitor portion 30 constitutes a solid electrolytic capacitor.

The capacitor portion 30 illustrated in FIG. 2 and FIG. 3 has a first main surface 30a and a second main surface 30b opposite to each other in a thickness direction T.

In the capacitor array according to the present invention, the multiple through-portions include a first through-portion extending in the first direction perpendicular to the thickness direction and a second through-portion extending in the second direction perpendicular to the thickness direction and intersecting the first direction.

As illustrated in FIG. 1, the multiple through-portions 15 include a first through-portion 15A extending in a first direction U and a second through-portion 15B extending in a second direction V.

The first direction U is perpendicular to the thickness direction T.

The second direction V is perpendicular to the thickness direction T and intersects the first direction U.

As illustrated in FIG. 1 and other drawings, the first direction U and the second direction V may be perpendicular to each other, or intersect each other at an angle different from 90°.

Herein, the through-portions indicate portions that extend through the capacitor portions in the thickness direction. Each through-portion has a state where a filler fills the through-portion through-hole that extends through the capacitor portion in the thickness direction, and a state where no filler fills the through-portion through-hole that extends through the capacitor portion in the thickness direction.

In the capacitor array according to the present invention, in a sectional view taken in the thickness direction, each of the first through-portion and the second through-portion independently has a taper that has a width decreasing from one of the first main surface of the capacitor portion and the second main surface of the capacitor portion to the other one of the first main surface and the second main surface.

As illustrated in FIG. 2, in a sectional view taken in the thickness direction T, more specifically, in a sectional view taken in the thickness direction T and the second direction V, the first through-portion 15A has a taper that has a width (herein, a dimension in the second direction V) decreasing from one of the first main surface 30a of the capacitor portion 30 and the second main surface 30b of the capacitor portion 30 to the other one of the first main surface 30a and the second main surface 30b.

As illustrated in FIG. 2, the first through-portion 15A may have the width decreasing from the first main surface 30a of the capacitor portion 30 to the second main surface 30b of the capacitor portion 30, or from the second main surface 30b to the first main surface 30a.

The first through-portion 15A may have a symmetrical cross section, as illustrated in FIG. 2, or asymmetrical cross section taken in the thickness direction T as long as its width decreases from one of the first main surface 30a of the capacitor portion 30 and the second main surface 30b of the capacitor portion 30 to the other main surface.

As illustrated in FIG. 3, in a cross section taken in the thickness direction T, more specifically, in a cross section taken in the thickness direction T and the first direction U, the second through-portion 15B has a taper that has a width (herein, a dimension in the first direction U) decreasing from one of the first main surface 30a of the capacitor portion 30 and the second main surface 30b of the capacitor portion 30 to the other one of the first main surface 30a and the second main surface 30b.

As illustrated in FIG. 3, the second through-portion 15B may have the width decreasing from the first main surface 30a of the capacitor portion 30 to the second main surface 30b of the capacitor portion 30, or from the second main surface 30b to the first main surface 30a.

The second through-portion 15B may have a symmetrical cross section, as illustrated in FIG. 3, or asymmetrical cross section taken in the thickness direction T as long as its width decreases from one of the first main surface 30a of the capacitor portion 30 and the second main surface 30b of the capacitor portion 30 to the other main surface.

Each of the first through-portion 15A and the second through-portion 15B may independently have a taper that has a width decreasing from one of the first main surface 30a of the capacitor portion 30 and the second main surface 30b of the capacitor portion 30 to the other one of the first main surface 30a and the second main surface 30b. More specifically, the first through-portion 15A and the second through-portion 15B may have any of the aspects (1) to (4) described below.

(1) Each of the first through-portion 15A and the second through-portion 15B has the width decreasing from the first main surface 30a of the capacitor portion 30 to the second main surface 30b of the capacitor portion 30.

(2) Each of the first through-portion 15A and the second through-portion 15B has the width decreasing from the second main surface 30b of the capacitor portion 30 to the first main surface 30a of the capacitor portion 30.

(3) The first through-portion 15A has the width decreasing from the first main surface 30a of the capacitor portion 30 to the second main surface 30b of the capacitor portion 30, whereas the second through-portion 15B has the width decreasing from the second main surface 30b to the first main surface 30a.

(4) The first through-portion 15A has the width decreasing from the second main surface 30b of the capacitor portion 30 to the first main surface 30a of the capacitor portion 30, whereas the second through-portion 15B has the width decreasing from the first main surface 30a to the second main surface 30b.

In the capacitor array according to the present invention, preferably, each of the first through-portion and the second through-portion has the width decreasing from the first main surface of the capacitor portion to the second main surface of the capacitor portion.

As illustrated in FIG. 2 and FIG. 3, preferably, each of the first through-portion 15A and the second through-portion 15B has the width decreasing from the first main surface 30a of the capacitor portion 30 to the second main surface 30b of the capacitor portion 30. This aspect corresponds to the aspect (1) described above.

In the capacitor array according to the present invention, the first through-portion has a taper angle that is different from a taper angle of the second through-portion.

As illustrated in FIG. 2 and FIG. 3, the first through-portion 15A has a taper angle θ1 that is different from a taper angle θ2 of the second through-portion 15B.

Herein, in a sectional view taken in the thickness direction, the taper angle of the through-portion indicates an angle formed by two opposing sides forming the outline of the through-portion.

In the capacitor array according to the present invention, when each of the first through-portion and the second through-portion has the width decreasing from the first main surface of the capacitor portion to the second main surface of the capacitor portion, preferably, the taper angle of the second through-portion is smaller than the taper angle of the first through-portion.

As illustrated in FIG. 2 and FIG. 3, when each of the first through-portion 15A and the second through-portion 15B has the width decreasing from the first main surface 30a of the capacitor portion 30 to the second main surface 30b of the capacitor portion 30, preferably, the taper angle θ2 of the second through-portion 15B is smaller than the taper angle θ1 of the first through-portion 15A. In this case, an inclination angle of the end surface on the side closer to the second through-portion 15B of the capacitor portion 30 with respect to the thickness direction T is smaller, and thus, the active region of the capacitor portion 30 is greater on the side closer to the second through-portion 15B.

In the capacitor array according to the present invention, when each of the first through-portion and the second through-portion has the width decreasing from the first main surface of the capacitor portion to the second main surface of the capacitor portion, preferably, the second through-portion has the width smaller than the width of the first through-portion in a plane coplanar with the first main surface of the capacitor portion.

As illustrated in FIG. 2 and FIG. 3, when each of the first through-portion 15A and the second through-portion 15B has the width decreasing from the first main surface 30a of the capacitor portion 30 to the second main surface 30b of the capacitor portion 30, preferably, the second through-portion 15B has a width W2 smaller than a width W1 of the first through-portion 15A in a plane coplanar with the first main surface 30a of the capacitor portion 30. In this case, the capacitor layer 10 can reduce the region where the capacitor portions 30 are not located, that is, the region where at least the second through-portion 15B is located in the region where the first through-portion 15A and the second through-portion 15B are located. Thus, the capacitor layer 10 can ensure a large region where the capacitor portions 30 are located.

The taper shape, the taper angle, and the width of each of the first through-portion and the second through-portion are identified through observation of the cross section taken in the thickness direction as illustrated in FIG. 2 and FIG. 3 with a scanning electron microscope (SEM).

As illustrated in FIG. 2 and FIG. 3, preferably, the capacitor layer 10 also includes an insulating layer 24 disposed over the surface of each dielectric layer 35 that is not receiving the cathode layer 36 and that is closer to at least one of the first main surface 30a of the capacitor portion 30 and the second main surface 30b of the capacitor portion 30. In this case, the capacitor layer 10 ensures insulation between the anode plate 31 and the cathode layers 36, and prevents short circuits between the anode plate 31 and the cathode layers 36.

The insulating layer 24 may be disposed over the surface of the dielectric layer 35 closer to the first main surface 30a of the capacitor portion 30, over the surface of the dielectric layer 35 closer to the second main surface 30b of the capacitor portion 30, or over the surface of the dielectric layer 35 closer to each of the first main surface 30a and the second main surface 30b of the capacitor portion 30, as illustrated in FIG. 2 and FIG. 3.

Examples of the material of the insulating layer 24 include a resin material such as epoxy, phenol, or polyimide, and a composite material containing a resin material such as epoxy, phenol, or polyimide and an inorganic filler such as silica or alumina.

In the capacitor array according to the present invention, preferably, the capacitor layer further includes a first insulating portion disposed over at least one of the first main surface of the capacitor portion and the second main surface of the capacitor portion, and the first insulating portion extends through the first through-portion and does not extend through the second through-portion.

As illustrated in FIG. 2 and FIG. 3, preferably, the capacitor layer 10 further includes a first insulating portion 25A disposed over at least one of the first main surface 30a of the capacitor portion 30 and the second main surface 30b of the capacitor portion 30.

The first insulating portion 25A may be disposed over the first main surface 30a of the capacitor portion 30, the second main surface 30b of the capacitor portion 30, or each of the first main surface 30a and the second main surface 30b of the capacitor portion 30 as illustrated in FIG. 2 and FIG. 3.

As illustrated in FIG. 2, preferably, the first insulating portion 25A extends through the first through-portion 15A.

As illustrated in FIG. 3, preferably, the first insulating portion 25A does not extend through the second through-portion 15B.

In the capacitor array according to the present invention, preferably, the capacitor layer further includes a second insulating portion disposed over the surface of the first insulating portion, and the second insulating portion extends through the second through-portion and does not extend through the first through-portion.

As illustrated in FIG. 2 and FIG. 3, preferably, the capacitor layer 10 further includes a second insulating portion 25B disposed over the surface of the first insulating portion 25A.

As illustrated in FIG. 2, preferably, the second insulating portion 25B does not extend through the first through-portion 15A.

As illustrated in FIG. 3, preferably, the second insulating portion 25B extends through the second through-portion 15B.

From the above, preferably, as illustrated in FIG. 2, the first insulating portion 25A extends through the first through-portion 15A, and the second insulating portion 25B does not extend through the first through-portion 15A.

In addition, preferably, as illustrated in FIG. 3, the second insulating portion 25B extends through the second through-portion 15B, and the first insulating portion 25A does not extend through the second through-portion 15B. More specifically, preferably, as illustrated in FIG. 3, the first insulating portion 25A is separated by the second insulating portion 25B at a position overlapping the second through-portion 15B in the thickness direction T.

Examples of the material of the first insulating portion 25A and the second insulating portion 25B include a resin material such as epoxy, phenol, or polyimide, and a composite material containing a resin material such as epoxy, phenol, or polyimide and an inorganic filler such as silica or alumina.

The material of the first insulating portion 25A and the material of the second insulating portion 25B may be the same or different from each other.

The capacitor layer 10 may further include an insulating portion 25 including the above-described first insulating portion 25A and the above-described second insulating portion 25B, the insulating portion 25 being disposed over at least one of the first main surface 30a of the capacitor portion 30 and the second main surface 30b of the capacitor portion 30.

Effects of the capacitor array according to the present invention characteristic in that the taper angle of the first through-portion and the taper angle of the second through-portion are different from each other are described below with reference to an example of a method for manufacturing the capacitor array 1 having cross sections illustrated in FIG. 2 and FIG. 3.

<Process of Fabricating Capacitor Sheet>

Figure 4:
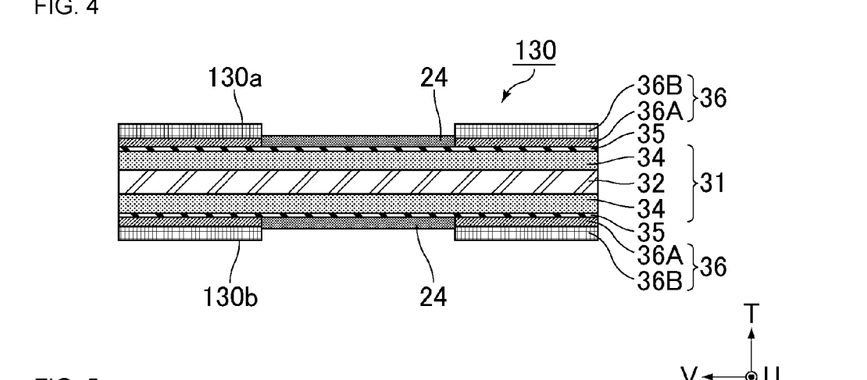
FIG. 4 is a schematic sectional view of a process of fabricating a capacitor sheet included, as an example, in a method for manufacturing a capacitor array according to the present invention, at a position corresponding to the cross section illustrated in FIG. 2.
Figure 5:
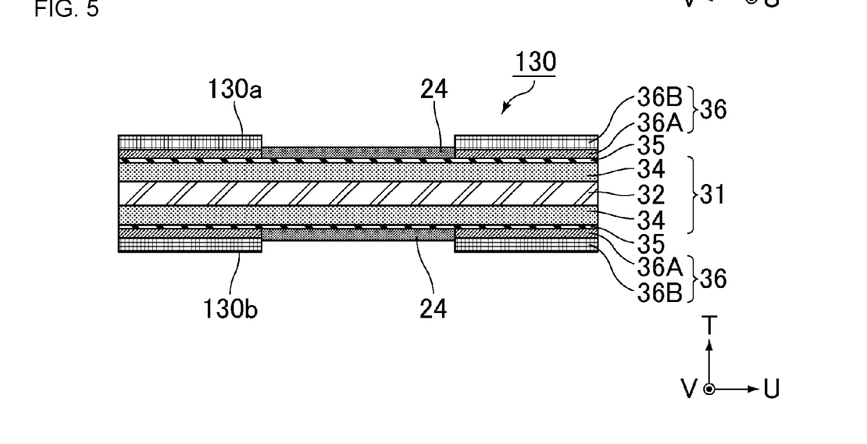
FIG. 5 is a schematic sectional view of the process of fabricating the capacitor sheet included, as an example, in the method for manufacturing the capacitor array according to the present invention, at a position corresponding to the cross section illustrated in FIG. 3.

FIG. 4 is a schematic sectional view of a process of fabricating a capacitor sheet included, as an example, in a method for manufacturing a capacitor array according to the present invention, at a position corresponding to the cross section illustrated in FIG. 2. FIG. 5 is a schematic sectional view of the process of fabricating the capacitor sheet included, as an example, in the method for manufacturing the capacitor array according to the present invention, at a position corresponding to the cross section illustrated in FIG. 3.

First, the anode plate 31 having the main surfaces at least one of which is composed of the porous layer 34 is prepared.

Then, the anode plate 31 undergoes anodic oxidation to form the dielectric layers 35 over the surfaces of the porous layers 34.

Alternatively, chemically treated foil may be prepared as the anode plate 31 with the dielectric layers 35 disposed over the surfaces of the porous layers 34.

Subsequently, to divide the active region of each capacitor portion, an insulating resin is applied to the surfaces of the dielectric layers 35 through, for example, screen printing or dispenser application to form the insulating layers 24 in a predetermined region.

Subsequently, the solid electrolytic layers 36A are disposed over the surfaces of the dielectric layers 35 in a region where the insulating layer 24 is not disposed. For example, the solid electrolytic layers 36A are formed by a method of forming a polymerized film such as poly(3,4-ethylenedioxythiophene) over the surface of the dielectric layer 35 with a treatment liquid containing a monomer such as 3,4-ethylenedioxythiophene, or a method of coating the surfaces of the dielectric layers 35 with a polymer dispersion such as poly(3,4-ethylenedioxythiophene) and drying the surface. Preferably, external layers that cover the surfaces of the dielectric layers 35 are formed after forming an internal layer that fills the pores (recesses) in the dielectric layers 35, as the solid electrolytic layers 36A.

In addition, the conductor layer 36B is disposed over the surface of the solid electrolytic layer 36A. For example, as the conductor layer 36B, a carbon layer and a copper layer are successively disposed over the solid electrolytic layer 36A. In this case, for example, the carbon layer is formed in a predetermined region by applying carbon paste to the surface of the solid electrolytic layer 36A through, for example, sponge transfer, screen printing, dispenser application, or inkjet printing. Thereafter, the copper layer is formed in a predetermined region by applying copper paste to the surface of the carbon layer through, for example, sponge transfer, screen printing, spray coating, dispenser application, or inkjet printing.

Thus, each cathode layer 36 including the solid electrolytic layer 36A and the conductor layer 36B is disposed over the surface of the dielectric layer 35.

In the above manner, a capacitor sheet 130 as illustrated in FIG. 4 and FIG. 5 including the anode plate 31, the dielectric layers 35 disposed over the surfaces of the porous layers 34 of the anode plate 31, and the cathode layers 36 disposed over the surfaces of the dielectric layers 35 is fabricated.

As illustrated in FIG. 4 and FIG. 5, the capacitor sheet 130 includes a first main surface 130a and a second main surface 130b opposite to each other in the thickness direction T.

<Process of Forming First Through-Portion Through-Hole>

Figure 6:
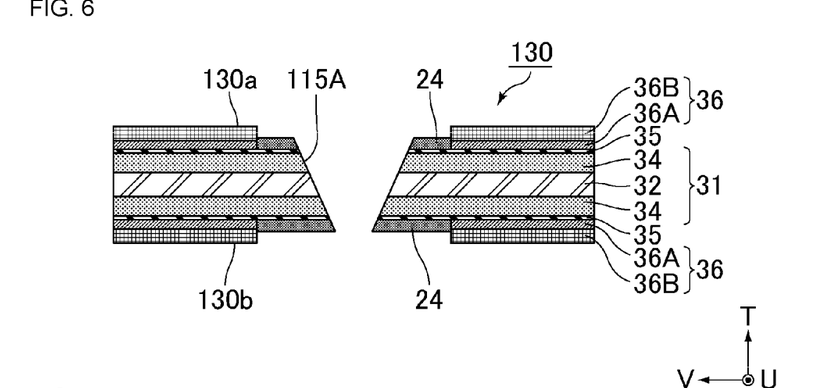
FIG. 6 is a schematic sectional view of a process of forming a first through-portion through-hole included, as an example, in the method for manufacturing the capacitor array according to the present invention, performed in the state illustrated in FIG. 4 in cross section.

FIG. 6 is a schematic sectional view of a process of forming a first through-portion through-hole included, as an example, in the method for manufacturing the capacitor array according to the present invention, performed in the state illustrated in FIG. 4 in cross section.

Laser processing is performed on a portion of the capacitor sheet 130 having a cross section illustrated in FIG. 4 from over the first main surface 130a. Thus, as illustrated in FIG. 6, a first through-portion through-hole 115A extending through the capacitor sheet 130 in the thickness direction T is formed in the first direction U at a position not overlapping the cathode layers 36 in the thickness direction T.

As illustrated in FIG. 6, in a sectional view taken in the thickness direction T, more specifically, in a sectional view taken in the thickness direction T and the second direction V, the first through-portion through-hole 115A thus formed has a taper that has the width decreasing from the first main surface 130a of the capacitor sheet 130 to the second main surface 130b of the capacitor sheet 130.

Alternatively, the first through-portion through-hole may be formed by performing laser processing on a portion of the capacitor sheet 130 having the cross section illustrated in FIG. 4 from over the second main surface 130b. In this case, in a sectional view taken in the thickness direction T, more specifically, in a sectional view taken in the thickness direction T and the second direction V, the first through-portion through-hole thus formed has a taper that has the width decreasing from the second main surface 130b of the capacitor sheet 130 to the first main surface 130a of the capacitor sheet 130.

As described above, when the first through-portion through-hole 115A extending in the first direction U is formed in the capacitor sheet 130, the capacitor sheet 130 is cut in the first direction U. At this time, the first through-portion through-hole 115A is formed in the first direction U so that the capacitor sheet 130 is not continuously cut from one end to the other end in the first direction U. Thus, the capacitor sheet 130 is prevented from being entirely separated into multiple discrete pieces. This structure thus improves handleability in the downstream process.

The present process is not performed on the portion of the capacitor sheet 130 having the cross section illustrated in FIG. 5.

<Process of Forming First Insulating Portion>

Figure 7:
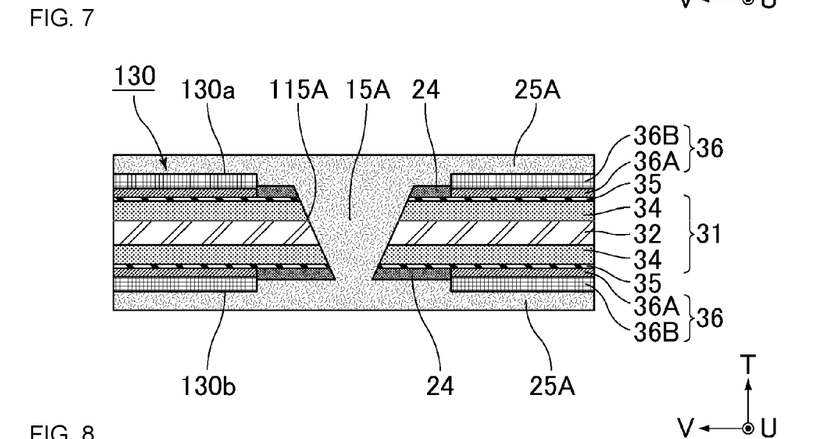
FIG. 7 is a schematic sectional view of a process of forming a first insulating portion included, as an example, in the method for manufacturing the capacitor array according to the present invention, performed in the state illustrated in FIG. 6 in cross section.
Figure 8:
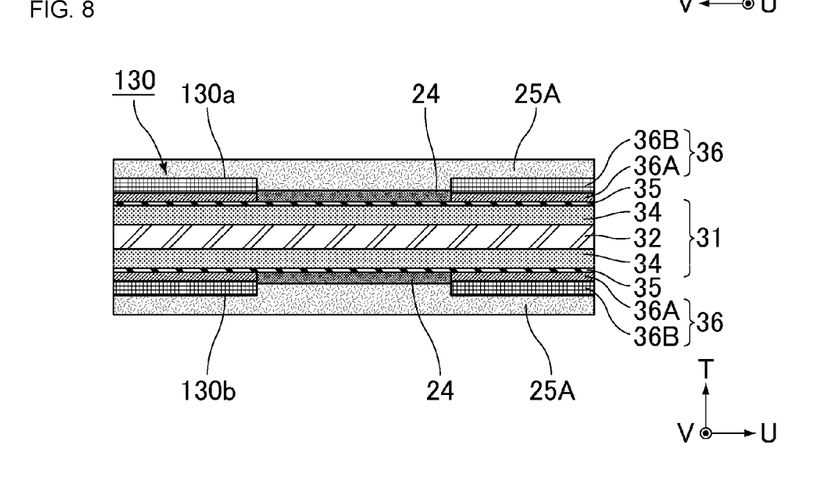
FIG. 8 is a schematic sectional view of the process of forming the first insulating portion included, as an example, in the method for manufacturing the capacitor array according to the present invention, performed in the state illustrated in FIG. 5 in cross section.

FIG. 7 is a schematic sectional view of a process of forming a first insulating portion included, as an example, in the method for manufacturing the capacitor array according to the present invention, performed in the state illustrated in FIG. 6 in cross section. FIG. 8 is a schematic sectional view of the process of forming the first insulating portion included, as an example, in the method for manufacturing the capacitor array according to the present invention, performed in the state illustrated in FIG. 5 in cross section.

An insulating material is disposed by press working on a portion having the cross section illustrated in FIG. 6 in the capacitor sheet 130 having the cross sections illustrated in FIG. 5 and FIG. 6. Thus, as illustrated in FIG. 7, the first insulating portion 25A is formed through the first through-portion through-hole 115A while being formed over the first main surface 130a of the capacitor sheet 130 and the second main surface 130b of the capacitor sheet 130. Concurrently, as illustrated in FIG. 8, the first insulating portion 25A is formed over the first main surface 130a and the second main surface 130b of the capacitor sheet 130 at a portion of the capacitor sheet 130 having the cross section illustrated in FIG. 5. In the above manner, the capacitor sheet 130 is fastened by the first insulating portion 25A while being partially separated by the first through-portion through-hole 115A.

The first insulating portion 25A thus formed is disposed over the first main surface 130a of the capacitor sheet 130 and the second main surface 130b of the capacitor sheet 130 as illustrated in FIG. 7 and FIG. 8, and extends through the first through-portion through-hole 115A as illustrated in FIG. 7.

Thus, as illustrated in FIG. 7, the first through-portion 15A is formed while the first insulating portion 25A is disposed through the first through-portion through-hole 115A. The first through-portion 15A thus formed has a shape conforming to the shape of the first through-portion through-hole 115A. In other words, as illustrated in FIG. 7, in a sectional view taken in the thickness direction T, the first through-portion 15A has a taper that has the width decreasing from the first main surface 130a of the capacitor sheet 130 to the second main surface 130b of the capacitor sheet 130. As described above, the first through-portion through-hole 115A is formed in the first direction U. Thus, the first through-portion 15A is formed in the first direction U (refer to FIG. 1).

The first insulating portion 25A may be formed through the first through-portion through-hole 115A while being formed over one of the first main surface 130a of the capacitor sheet 130 and the second main surface 130b of the capacitor sheet 130.

As described above, when the first insulating portion 25A is to be formed, the capacitor sheet 130 is not entirely separated into multiple discrete pieces although having the first through-portion through-hole 115A. This structure prevents, when the first insulating portion 25A is to be formed, portions of the capacitor sheet 130 separated by the first through-portion through-hole 115A from being moved and brought into contact with each other by the flow of materials (for example, a resin material) of the first insulating portion 25A. Thus, a capacitor array obtained later can prevent short circuits between the capacitor portions.

When the first insulating portion 25A is to be formed by press working at a high pressure, the above movement or contact can be prevented. Thus, a large processing margin can be ensured to form the first insulating portion 25A, and the processability improves. When the first insulating portion 25A can be formed by press working at a high pressure, the adhesiveness between the first insulating portion 25A and the capacitor sheet 130 can be improved, or voids in the first insulating portion 25A can be reduced, and thus can improve the reliability of the capacitor array obtained later.

<Process of Forming Second Through-Portion Through-Hole>

Figure 9:
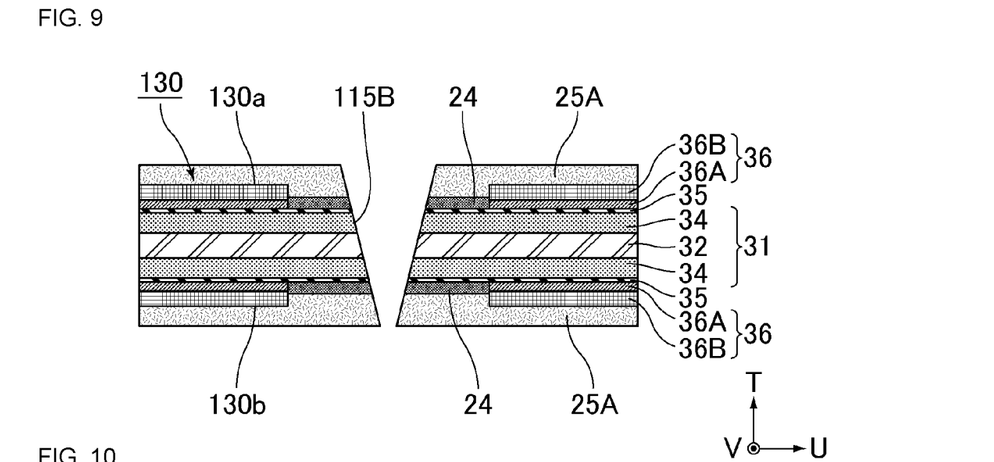
FIG. 9 is a schematic sectional view of a process of forming a second through-portion through-hole included, as an example, in the method for manufacturing the capacitor array according to the present invention, performed in the state illustrated in FIG. 8 in cross section.

FIG. 9 is a schematic sectional view of a process of forming a second through-portion through-hole included, as an example, in the method for manufacturing the capacitor array according to the present invention, performed in the state illustrated in FIG. 8 in cross section.

As illustrated in FIG. 9, a second through-portion through-hole 115B that extends through the capacitor sheet 130 and the first insulating portion 25A in the thickness direction T is formed in the second direction V at a portion not overlapping the cathode layer 36 in the thickness direction T. The second through-portion through-hole 115B is formed by performing laser processing on a portion of the capacitor sheet 130 provided with the first insulating portion 25A and having the cross section illustrated in FIG. 8 from over the first main surface 130a.

As illustrated in FIG. 9, in a sectional view taken in the thickness direction T, more specifically, in a sectional view taken in the thickness direction T and the first direction U, the second through-portion through-hole 115B thus formed has a taper that has the width decreasing from the first main surface 130a of the capacitor sheet 130 to the second main surface 130b of the capacitor sheet 130.

The second through-portion through-hole may be formed by performing laser processing on the portion of the capacitor sheet 130 provided with the first insulating portion 25A and having the cross section illustrated in FIG. 8 from over the second main surface 130b. In this case, in a sectional view taken in the thickness direction T, more specifically, in a sectional view taken in the thickness direction T and the first direction U, the second through-portion through-hole thus formed has a taper that has the width decreasing from the second main surface 130b of the capacitor sheet 130 to the first main surface 130a of the capacitor sheet 130.

As described above, when the second through-portion through-hole 115B extending in the second direction V is formed in the capacitor sheet 130 provided with the first insulating portion 25A, the capacitor sheet 130 and the first insulating portion 25A are collectively cut in the second direction V. At this time, the second through-portion through-hole 115B is formed in the second direction V so that the capacitor sheet 130 provided with the first insulating portion 25A is not continuously cut from one end to the other end in the second direction V. Thus, the capacitor sheet 130 provided with the first insulating portion 25A is prevented from being entirely separated into multiple discrete pieces. This structure thus improves handleability in the downstream process.

The present processing is not performed on the portion of the capacitor sheet 130 having a cross section illustrated in FIG. 7.

<Process of Forming Second Insulating Portion>

Figure 10:
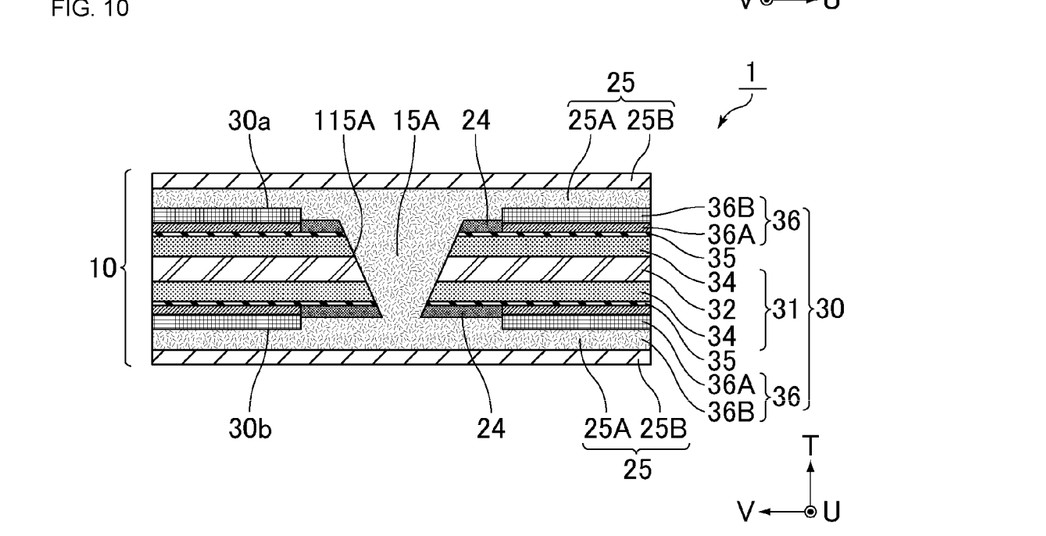
FIG. 10 is a schematic sectional view of a process of forming a second insulating portion included, as an example, in the method for manufacturing the capacitor array according to the present invention, performed in the state illustrated in FIG. 7 in cross section.
Figure 11:
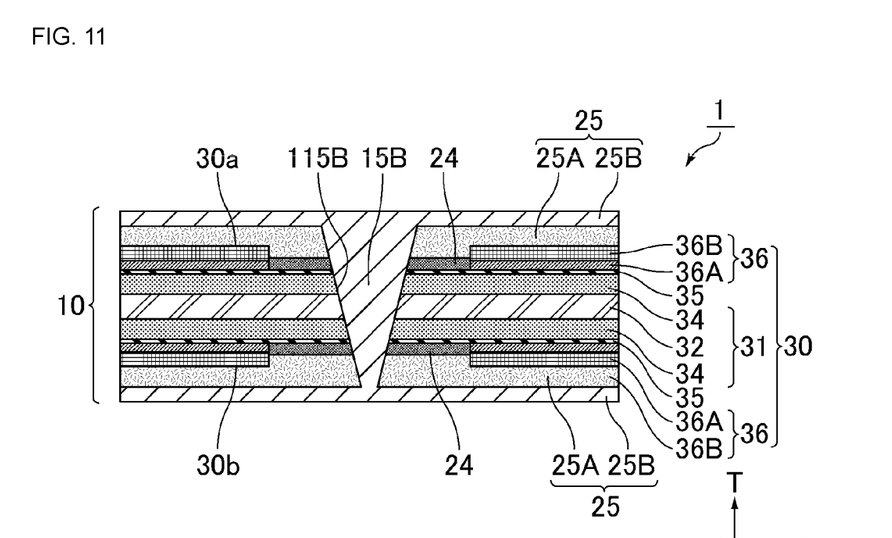
FIG. 11 is a schematic sectional view of the process of forming the second insulating portion included, as an example, in the method for manufacturing the capacitor array according to the present invention, performed in the state illustrated in FIG. 9 in cross section.

FIG. 10 is a schematic sectional view of a process of forming a second insulating portion included, as an example, in the method for manufacturing the capacitor array according to the present invention, performed in the state illustrated in FIG. 7 in cross section. FIG. 11 is a schematic sectional view of the process of forming the second insulating portion included, as an example, in the method for manufacturing the capacitor array according to the present invention, performed in the state illustrated in FIG. 9 in cross section.

An insulating material is disposed by press working on the capacitor sheet 130 having the cross section illustrated in FIG. 7 and FIG. 9. Thus, at the portion having the cross section illustrated in FIG. 7, as illustrated in FIG. 10, the second insulating portion 25B is disposed over the surface of the first insulating portion 25A. Concurrently, at the portion having the cross section illustrated in FIG. 9, as illustrated in FIG. 11, the second insulating portion 25B is disposed over the surface of the first insulating portion 25A, and formed through the second through-portion through-hole 115B.

The second insulating portion 25B thus formed is disposed over the surface of the first insulating portion 25A as illustrated in FIG. 10 and FIG. 11, extends through the second through-portion through-hole 115B as illustrated in FIG. 11, and does not extend through the first through-portion 15A as illustrated in FIG. 10.

Thus, as illustrated in FIG. 11, the second through-portion 15B is formed while the second insulating portion 25B is disposed through the second through-portion through-hole 115B. The shape of the second through-portion 15B thus formed conforms to the shape of the second through-portion through-hole 115B. In other words, as illustrated in FIG. 11, in a sectional view taken in the thickness direction T, the second through-portion 15B has a taper that has the width decreasing from the first main surface 30a of the capacitor portion 30 to the second main surface 30b of the capacitor portion 30. As described above, the second through-portion through-hole 115B is formed in the second direction V, and thus, the second through-portion 15B is formed in the second direction V (refer to FIG. 1).

As described above, as illustrated in FIG. 10 and FIG. 11, the capacitor layer 10 including the multiple capacitor portions 30 divided by the first through-portion 15A and the second through-portion 15B and arranged in a plane is fabricated, and the multiple capacitor portions 30 are integrated by the first insulating portion 25A and the second insulating portion 25B. Thus, the capacitor array 1 having the cross section illustrated in FIG. 2 and FIG. 3 is manufactured.

In the method for manufacturing the capacitor array 1, the cutting process of dividing the capacitor sheet 130 into the multiple capacitor portions 30 through laser processing includes <a process of forming the first through-portion through-hole> including cutting of the capacitor sheet 130 in the first direction U, <a process of forming the second through-portion through-hole> including cutting of the capacitor sheet 130 in the second direction V, and <a process of forming the first insulating portion> between these processes. Thus, the capacitor sheet 130 is prevented from being entirely separated into multiple discrete pieces during manufacture, and thus the handleability improves. Furthermore, in <the process of forming the first insulating portion>, press working can be performed at a high pressure to form the first insulating portion 25A. Thus, the processability improves, and the reliability of the capacitor array 1 also improves.

In the method for manufacturing the capacitor array 1, when <the process of forming the first through-portion through-hole> and <the process of forming the second through-portion through-hole> are separately performed while <the process of forming the first insulating portion> is performed in between, the thickness of a target in which the first through-portion through-hole 115A is formed in <the process of forming the first through-portion through-hole>, that is, the thickness of the capacitor sheet 130, and the thickness of a target in which the second through-portion through-hole 115B is formed in <the process of forming the second through-portion through-hole>, that is, the thickness of the capacitor sheet 130 provided with the first insulating portion 25A differ from each other. Thus, as illustrated in FIG. 6 and FIG. 9, the taper angle of the first through-portion through-hole 115A formed in <the process of forming the first through-portion through-hole>, and the taper angle of the second through-portion through-hole 115B formed in <the process of forming the second through-portion through-hole> differ from each other.

In other words, in the method for manufacturing the capacitor array 1, when <the process of forming the first through-portion through-hole> and <the process of forming the second through-portion through-hole> are performed separately with <the process of forming the first insulating portion> performed in between, the manufactured capacitor array 1 has a characteristic in that the taper angle θ1 of the first through-portion 15A and the taper angle θ2 of the second through-portion 15B differ from each other as illustrated in FIG. 2 and FIG. 3.

From the above, the capacitor array 1 having a characteristic in that the taper angle θ1 of the first through-portion 15A and the taper angle θ2 of the second through-portion 15B differ from each other has high handleability and processability during manufacture.

An example of an extended structure of the anode plate and the cathode layer in each capacitor portion in the capacitor array according to the present invention is described below.

Preferably, the capacitor array 1 illustrated in FIG. 1 further includes through-hole conductors 60, more specifically, a first through-hole conductor 62 and a second through-hole conductor 64.

Preferably, the through-hole conductors 60, more specifically, the first through-hole conductor 62 and the second through-hole conductor 64 extend through the capacitor portion 30 in the thickness direction T of the capacitor layer 10.

The anode plate 31 and the cathode layers 36 of the capacitor portion 30 are led out using the first through-hole conductor 62 and the second through-hole conductor 64, respectively.

First, an example of a lead-out structure of the anode plate 31 of the capacitor portion 30 is described below.

Figure 12:
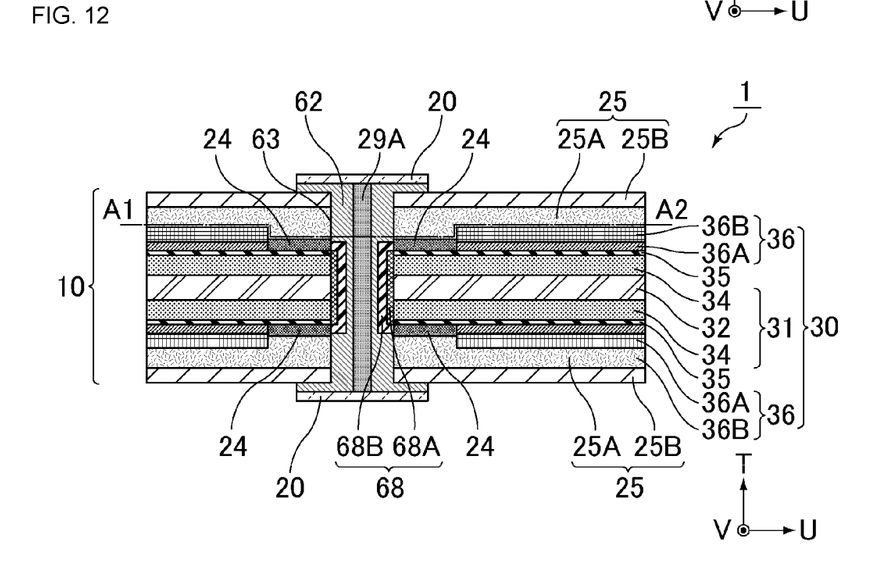
FIG. 12 is a schematic sectional view of an example of a cross section of the capacitor array including a cross section taken along line segment A1-A2 in FIG. 1.

FIG. 12 is a schematic sectional view of an example of a cross section of the capacitor array including a cross section taken along line segment A1-A2 in FIG. 1. Line segment A1-A2 in FIG. 12 corresponds to line segment A1-A2 in FIG. 1.

As illustrated in FIG. 12, the first through-hole conductor 62 preferably extends through the capacitor portion 30 in the thickness direction T of the capacitor layer 10. More specifically, preferably, the first through-hole conductor 62 is disposed on at least an inner wall surface of a first through-hole 63 extending through the capacitor portion 30 in the thickness direction T.

Preferably, the first through-hole conductor 62 is electrically connected to the end surface of the anode plate 31 opposing the inner wall surface of the first through-hole 63 in a plane direction perpendicular to the thickness direction T.

The plane direction is a direction including the first direction U and the second direction V that are perpendicular to the thickness direction T.

Preferably, the core 32 and the porous layers 34 are exposed at the end surface of the anode plate 31 electrically connected to the first through-hole conductor 62. In this case, in addition to the core 32, the porous layers 34 are also electrically connected to the first through-hole conductor 62.

For example, the first through-hole conductor 62 is formed in the following manner. First, drill processing, laser processing, or other processing is performed on a portion where the first through-hole conductor 62 is to be formed to form the first through-hole 63. Then, the inner wall surface of the first through-hole 63 is metalized with a low-resistant metal such as copper, gold, or silver to form the first through-hole conductor 62. Metalizing the inner wall surface of the first through-hole 63 through, for example, electroless copper plating or electrolytic copper plating to form the first through-hole conductor 62 facilitates the processing. To form the first through-hole conductor 62, for example, a metal or a composite material containing a metal and a resin may fill the first through-hole 63 instead of metalizing the inner wall surface of the first through-hole 63.

As illustrated in FIG. 12, preferably, the capacitor array 1 further includes an anode connection layer 68 disposed between the first through-hole conductor 62 and the end surface of the anode plate 31. In the example illustrated in FIG. 12, the anode connection layer 68 is in contact with both the first through-hole conductor 62 and the end surface of the anode plate 31.

The anode connection layer 68 disposed between the first through-hole conductor 62 and the end surface of the anode plate 31 serves as a barrier layer to the anode plate 31, more specifically, a barrier layer to the core 32 and the porous layers 34. Using the anode connection layer 68 reduces dissolution of the anode plate 31 in treatment with a chemical solution used to form, for example, a conductive portion 20, described later, reduces the chemical solution intruding into the capacitor portions 30, and thus reliability of the capacitor array 1 is more likely to improve.

As illustrated in FIG. 12, preferably, the first through-hole conductor 62 and the end surface of the anode plate 31 are electrically connected to each other with the anode connection layer 68 interposed therebetween.

As illustrated in FIG. 12, the anode connection layer 68 may include, in order from the side closer to the end surface of the anode plate 31, a first anode connection layer 68A and a second anode connection layer 68B.

In the anode connection layer 68, for example, the first anode connection layer 68A may be a layer containing zinc as a main component, and the second anode connection layer 68B may be a layer containing nickel or copper as a main component. In this case, the first anode connection layer 68A is formed over the end surface of the anode plate 31 through, for example, zinc replacement deposition in zincate treatment. Thereafter, the second anode connection layer 68B is disposed over the surface of the first anode connection layer 68A through, for example, electroless nickel plating or electroless copper plating. The first anode connection layer 68A may be lost while the second anode connection layer 68B is formed. In this case, the anode connection layer 68 may be formed from simply the second anode connection layer 68B.

Preferably, the anode connection layer 68 includes a layer containing nickel as a main component. This structure reduces damages on, for example, metal (such as aluminum) forming the anode plate 31, and thus barrier characteristics of the anode connection layer 68 to the anode plate 31 are more likely to improve.

As illustrated in FIG. 12, preferably, the anode connection layer 68 has a greater dimension than the anode plate 31 in the thickness direction T. In this case, the entirety of the end surface of the anode plate 31 is covered with the anode connection layer 68. Thus, barrier characteristics of the anode connection layer 68 to the anode plate 31 are more likely to improve.

Preferably, the dimension of the anode connection layer 68 in the thickness direction T is greater than 100% and smaller than or equal to 200% of the dimension of the anode plate 31.

In the thickness direction T, the anode connection layer 68 may have a dimension the same as or smaller than the dimension of the anode plate 31.

The anode connection layer 68 between the first through-hole conductor 62 and the end surface of the anode plate 31 may be eliminated. In this case, the first through-hole conductor 62 may be directly connected to the end surface of the anode plate 31.

As illustrated in FIG. 1 and FIG. 12, when viewed in the thickness direction T, preferably, the first through-hole conductor 62 is electrically connected to the end surface of the anode plate 31 throughout the periphery of the first through-hole 63. As illustrated in FIG. 12, when the anode connection layer 68 is disposed between the first through-hole conductor 62 and the end surface of the anode plate 31, the first through-hole conductor 62 is preferably connected to the anode connection layer 68 throughout the periphery of the first through-hole 63 when viewed in the thickness direction T. In this case, the contact area between the first through-hole conductor 62 and the anode connection layer 68 increases, and thus the connection resistance between the first through-hole conductor 62 and the anode connection layer 68 is more likely to decrease. Thus, the connection resistance between the first through-hole conductor 62 and the anode plate 31 is more likely to decrease, and the equivalent series resistance (ESR) of the capacitor portions 30 is more likely to decrease. Moreover, the adhesiveness between the first through-hole conductor 62 and the anode connection layer 68 is more likely to improve. This structure is less likely to cause failures such as detachment between the first through-hole conductor 62 and the anode connection layer 68 due to thermal stress.

As illustrated in FIG. 12, preferably, the capacitor array 1 also includes the conductive portion 20 electrically connected to the first through-hole conductor 62. In the example illustrated in FIG. 12, the conductive portion 20 is disposed on the surface of the first through-hole conductor 62. The conductive portion 20 can function as a connection terminal of the capacitor array 1 (capacitor portion 30).

Examples of the material of the conductive portion 20 include low-resistant metals such as silver, gold, and copper. In this case, the conductive portion 20 is formed by, for example, plating the surface of the first through-hole conductor 62.

To improve adhesiveness between the conductive portion 20 and another component, more specifically, adhesiveness between the conductive portion 20 and the first through-hole conductor 62, a composite material containing a resin and at least one conductive filler selected from the group consisting of a silver filler, a copper filler, a nickel filler, and a carbon filler may be used as the material of the conductive portion 20.

As illustrated in FIG. 1 and FIG. 12, preferably, the capacitor array 1 also includes a first resin-filling portion 29A formed by filling the first through-hole 63 with a resin material. In the example illustrated in FIG. 1 and FIG. 12, the first resin-filling portion 29A is disposed in a space defined by the first through-hole conductor 62 on the inner wall surface of the first through-hole 63. When the space in the first through-hole 63 is occupied by forming the first resin-filling portion 29A, occurrences of delamination of the first through-hole conductor 62 are reduced.

Preferably, the coefficient of thermal expansion of the first resin-filling portion 29A is higher than the coefficient of thermal expansion of the first through-hole conductor 62. More specifically, preferably, the coefficient of thermal expansion of the resin material that fills the first through-hole 63 is higher than the coefficient of thermal expansion of the material (for example, copper) of the first through-hole conductor 62. In this case, when the first resin-filling portion 29A, more specifically, the resin material that fills the first through-hole 63 expands in a high-temperature environment, the first through-hole conductor 62 is pressed against the inner wall surface of the first through-hole 63 from inside of the first through-hole 63 to the outside. This structure fully reduces occurrences of delamination of the first through-hole conductor 62.

The coefficient of thermal expansion of the first resin-filling portion 29A may be the same as, or lower than the coefficient of thermal expansion of the first through-hole conductor 62. More specifically, the coefficient of thermal expansion of the resin material that fills the first through-hole 63 may be the same as or lower than the coefficient of thermal expansion of the material of the first through-hole conductor 62.

The capacitor array 1 may eliminate the first resin-filling portion 29A. In this case, the first through-hole conductor 62 is preferably disposed throughout the inside of the first through-hole 63 in addition to over the inner wall surface of the first through-hole 63.

Subsequently, an example of a lead-out structure of the cathode layer 36 of the capacitor portion 30 is described below.

Figure 13:
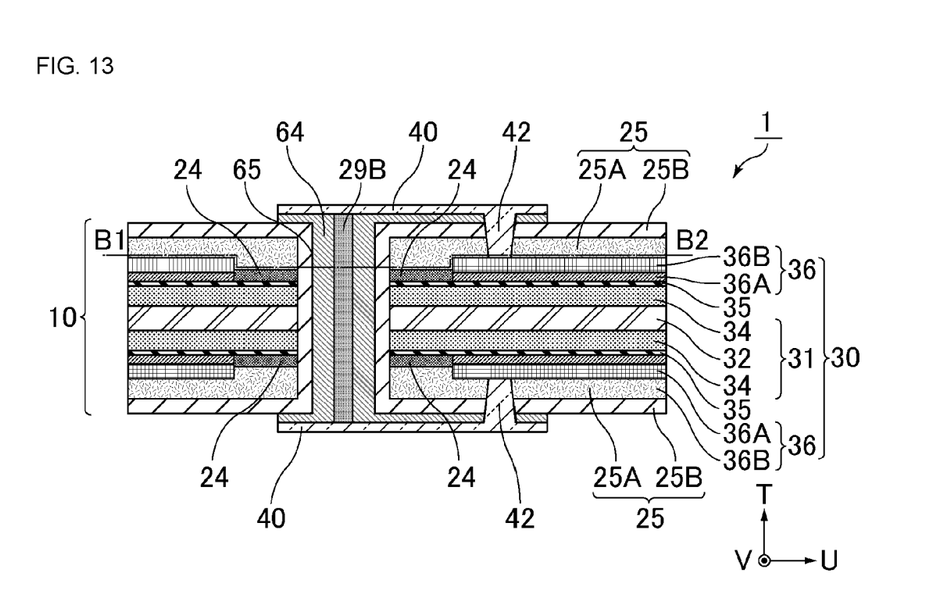
FIG. 13 is a schematic sectional view of an example of a cross section of the capacitor array including a cross section taken along line segment B1-B2 in FIG. 1.

FIG. 13 is a schematic sectional view of an example of a cross section of the capacitor array including a cross section taken along line segment B1-B2 in FIG. 1. Line segment B1-B2 in FIG. 13 corresponds to line segment B1-B2 in FIG. 1.

As illustrated in FIG. 13, preferably, the second through-hole conductor 64 extends through the capacitor portion 30 in the thickness direction T of the capacitor layer 10. More specifically, preferably, the second through-hole conductor 64 is disposed on at least the inner wall surface of a second through-hole 65 extending through, in the thickness direction T, the capacitor portion 30 in which the first through-hole conductor 62 is provided illustrated in, for example, FIG. 12.

As illustrated in FIG. 13, preferably, the second through-hole conductor 64 is electrically connected to the cathode layer 36. In the example illustrated in FIG. 13, a conductive portion 40 is disposed over the surface of the second through-hole conductor 64 to function as a connection terminal of the capacitor array 1 (capacitor portion 30). In the example illustrated in FIG. 13, via conductors 42 extend through the insulating portions 25 in the thickness direction T to be connected to the conductive portions 40 and the cathode layers 36. In the example illustrated in FIG. 13, the second through-hole conductor 64 is thus electrically connected to the cathode layers 36 through the conductive portion 40 and the via conductors 42. In this case, the capacitor array 1 can be reduced in size.

For example, the second through-hole conductor 64 is formed in the following manner. First, drill processing, laser processing, or other processing is performed on a portion where the second through-hole conductor 64 is to be formed to form a through-hole. Subsequently, the material (for example, a resin material) of the second insulating portion 25B fills the formed through-hole to form an insulating layer. Then, drill processing, laser processing, or other processing is performed on the formed insulating layer to form the second through-hole 65. In this case, the diameter of the second through-hole 65 is made smaller than the diameter of the insulating layer, and the material of the second insulating portion 25B is located between the through-hole formed in advance and the second through-hole 65. Thereafter, the inner wall surface of the second through-hole 65 is metalized with a low-resistant metal such as copper, gold, or silver to form the second through-hole conductor 64. Metalizing the inner wall surface of the second through-hole 65 through, for example, electroless copper plating or electrolytic copper plating to form the second through-hole conductor 64 facilitates the processing. To form the second through-hole conductor 64, for example, a metal or a composite material containing a metal and a resin may fill the second through-hole 65 instead of metalizing the inner wall surface of the second through-hole 65.

Examples of the material of the conductive portions 40 include low-resistant metals such as silver, gold, and copper. In this case, the conductive portions 40 are formed by, for example, plating the surfaces of the second through-hole conductor 64.

To improve adhesiveness between the conductive portions 40 and another component, more specifically, adhesiveness between the conductive portions 40 and the second through-hole conductor 64, a composite material containing a resin and at least one conductive filler selected from the group consisting of a silver filler, a copper filler, a nickel filler, and a carbon filler may be used as the material of the conductive portions 40.

Examples of the material of the via conductors 42 include the materials the same as those of the conductive portions 40.

For example, the via conductors 42 are formed by plating the inner wall surfaces of the through-holes extending through the insulating portions 25 in the thickness direction T, or by filling the through-holes with conductive paste and then performing thermal treatment on the paste.

As illustrated in FIG. 1 and FIG. 13, preferably, the capacitor array 1 further includes a second resin-filling portion 29B formed by filling the second through-hole 65 with a resin material. In the examples illustrated in FIG. 1 and FIG. 13, the second resin-filling portion 29B is disposed in a space defined by the second through-hole conductor 64 on the inner wall surface of the second through-hole 65. When the space in the second through-hole 65 is occupied by forming the second resin-filling portion 29B, occurrences of delamination of the second through-hole conductor 64 are reduced.

Preferably, the coefficient of thermal expansion of the second resin-filling portion 29B is higher than the coefficient of thermal expansion of the second through-hole conductor 64. More specifically, preferably, the coefficient of thermal expansion of the resin material that fills the second through-hole 65 is higher than the coefficient of thermal expansion of the material (for example, copper) of the second through-hole conductor 64. In this case, when the second resin-filling portion 29B, more specifically, the resin material that fills the second through-hole 65 expands in a high-temperature environment, the second through-hole conductor 64 is pressed against the inner wall surface of the second through-hole 65 from the inner side of the second through-hole 65 to the outside. This structure thus fully reduces occurrences of delamination of the second through-hole conductor 64.

The coefficient of thermal expansion of the second resin-filling portion 29B may be the same as or lower than the coefficient of thermal expansion of the second through-hole conductor 64. More specifically, the coefficient of thermal expansion of the resin material that fills the second through-hole 65 may be the same as or lower than the coefficient of thermal expansion of the material of the second through-hole conductor 64.

The capacitor array 1 may eliminate the second resin-filling portion 29B. In this case, preferably, the second through-hole conductor 64 is disposed throughout the inside of the second through-hole 65 in addition to over the inner wall surface of the second through-hole 65.

As illustrated in FIG. 13, preferably, the second insulating portion 25B extends between the anode plate 31 and the second through-hole conductor 64. In the example illustrated in FIG. 13, the second insulating portion 25B is in contact with both the anode plate 31 and the second through-hole conductor 64. The second insulating portion 25B extending between the anode plate 31 and the second through-hole conductor 64 ensures insulation between the anode plate 31 and the second through-hole conductor 64, and thus insulation between the anode plate 31 and the cathode layers 36, and prevents short circuits between the anode plate 31 and the cathode layers 36.

When the second insulating portion 25B extends between the anode plate 31 and the second through-hole conductor 64, as illustrated in FIG. 13, the core 32 and the porous layers 34 are preferably exposed at the end surface of the anode plate 31 that is in contact with the second insulating portion 25B. In this case, adhesiveness between the second insulating portion 25B and the porous layers 34 improves as the contact area between the second insulating portion 25B and the porous layers 34 increases. This structure is less likely to cause failures such as detachment between the second insulating portion 25B and the porous layers 34.

When the core 32 and the porous layers 34 are exposed at the end surface of the anode plate 31 that is in contact with the second insulating portion 25B, preferably, the insulating layers 24 extending into the porous layers 34 as a result of the material of the insulating layers 24 intruding through the voids in the porous layers 34 are disposed around the second through-hole conductor 64. This structure fully ensures insulation between the anode plate 31 and the second through-hole conductor 64, and thus insulation between the anode plate 31 and the cathode layers 36, and thus fully prevents short circuits between the anode plate 31 and the cathode layers 36.

When the core 32 and the porous layers 34 are exposed at the end surface of the anode plate 31 that is in contact with the second insulating portion 25B, preferably, the material of the second insulating portion 25B intrudes through the voids in the porous layers 34. This structure reduces occurrences of delamination attributable to the voids in the porous layers 34 while improving the mechanical strength of the porous layers 34.

Preferably, the coefficient of thermal expansion of the second insulating portion 25B is higher than the coefficient of thermal expansion of the second through-hole conductor 64. More specifically, the coefficient of thermal expansion of the material of the second insulating portion 25B is preferably higher than the coefficient of thermal expansion of the material (for example, copper) of the second through-hole conductor 64. In this case, when the second insulating portion 25B, more specifically, the material of the second insulating portion 25B expands in a high-temperature environment, the porous layers 34 and the second through-hole conductor 64 are pressed down, and thus occurrences of delamination are fully reduced.

The coefficient of thermal expansion of the second insulating portion 25B may be the same as or lower than the coefficient of thermal expansion of the second through-hole conductor 64. More specifically, the coefficient of thermal expansion of the material of the second insulating portion 25B may be the same as or lower than the coefficient of thermal expansion of the material of the second through-hole conductor 64.

In the capacitor array according to the present invention, the capacitor portions are not limited to electrolytic capacitors including the above-described solid electrolytic capacitors. In the capacitor array according to the present invention, each capacitor portion may constitute, for example, a thin film capacitor such as a trench capacitor having a metal-insulator-metal (MIM) structure, or a ceramic capacitor.

A capacitor array according to the present invention is used as, for example, a composite electronic component. Such a composite electronic component includes, for example, a capacitor array according to the present invention, an external electrode disposed on the outer side of the capacitor array according to the present invention and electrically connected to a first electrode (for example, an anode plate) and a second electrode (for example, a cathode layer), and an electronic component electrically connected to the external electrode.

In the composite electronic component, the electronic component electrically connected to the external electrode may be a passive element, an active element, each of a passive element and an active element, or a composite of a passive element and an active element.

Examples of a passive element include an inductor.

Examples of an active element include a memory, a graphical processing unit (GPU), a central processing unit (CPU), a micro processing unit (MPU), and a power management IC (PMIC).

When the capacitor array according to the present invention is used as a composite electronic component, as described above, the capacitor array according to the present invention is used as, for example, a substrate on which electronic components are mounted. Thus, when the capacitor array according to the present invention is formed into a sheet as a whole and an electronic component mounted on the capacitor array according to the present invention is formed into a sheet, the capacitor array according to the present invention and the electronic component can be electrically connected to each other in the thickness direction through the through-hole conductor that extends through the electronic component in the thickness direction. Thus, the passive element and the active element serving as electronic components can be formed as an integrated module.

For example, when the capacitor array according to the present invention is electrically connected between a voltage regulator including a semiconductor active element and a load to which a converted direct current is supplied, a switching regulator can be formed.

In the composite electronic component, after a circuit layer is formed over one main surface of a capacitor matrix sheet on which multiple capacitor arrays according to the present invention are laid out, the circuit layer may be electrically connected to a passive element or an active element serving as an electronic component.

Alternatively, the capacitor array according to the present invention may be located in a cavity portion preset in a substrate, and embedded with a resin, and a circuit layer may be disposed on the resin. A passive element or an active element serving as another electronic component may be mounted in another cavity portion in the same substrate.

Alternatively, the capacitor array according to the present invention may be mounted on a flat carrier such as a wafer or glass, an external layer portion may be formed from a resin, a circuit layer may then be formed, and the circuit layer may be electrically connected to a passive element or an active element serving as an electronic component.

REFERENCE SIGNS LIST 1 capacitor array
10 capacitor layer
15 through-portion
15A first through-portion
15B second through-portion
20, 40 conductive portion
24 insulating layer
25 insulating portion
25A first insulating portion
25B second insulating portion
29A first resin-filling portion
29B second resin-filling portion
30 capacitor portion
30a first main surface of capacitor portion
30b second main surface of capacitor portion
31 anode plate (first electrode)
32 core
34 porous layer
35 dielectric layer
36 cathode layer (second electrode)
36A solid electrolytic layer
36B conductor layer
42 via conductor
60 through-hole conductor
62 first through-hole conductor
63 first through-hole
64 second through-hole conductor
65 second through-hole
68 anode connection layer
68A first anode connection layer
68B second anode connection layer
115A first through-portion through-hole
115B second through-portion through-hole
130 capacitor sheet
130a first main surface of capacitor sheet
130b second main surface of capacitor sheet
θ1 taper angle of first through-portion
θ2 taper angle of second through-portion
T thickness direction
U first direction
V second direction
W1 width of first through-portion
W2 width of second through-portion

The invention claimed is:

1. A capacitor array comprising:
a capacitor layer including a plurality of capacitor portions divided by a plurality of through-portions and arranged in a plane,
wherein the capacitor portions each include a first electrode, a second electrode, and a dielectric layer between the first electrode and the second electrode, and each of the capacitor portions having a first main surface and a second main surface that are opposite to each other in a thickness direction thereof,
wherein the plurality of through-portions include a first through-portion extending in a first direction perpendicular to the thickness direction, and a second through-portion extending in a second direction perpendicular to the thickness direction and intersecting the first direction,
wherein, in a sectional view taken in the thickness direction, the first through-portion has a first taper that has a first width decreasing from one of the first main surface of the capacitor portion and the second main surface of the capacitor portion to another one of the first main surface and the second main surface, and the second through-portion has a second taper that has a second width decreasing from one of the first main surface of the capacitor portion and the second main surface of the capacitor portion to another one of the first main surface and the second main surface,
wherein the first taper has a first taper angle that is different from a second taper angle of the second taper,
wherein the capacitor layer further includes a first insulating portion over at least one of the first main surface of the capacitor portion and the second main surface of the capacitor portion, and
wherein the first insulating portion extends through the first through-portion and does not extend through the second through-portion.

2. The capacitor array according to claim 1,
wherein the first electrode is an anode plate having main surfaces at least one of which is a porous layer,
wherein the dielectric layer is over a surface of the porous layer, and
wherein the second electrode is a cathode layer over a surface of the dielectric layer.

3. The capacitor array according to claim 1,
wherein the first through-portion has a first width decreasing from the first main surface of the capacitor portion to the second main surface of the capacitor portion, and the second through-portion has a second width decreasing from the first main surface of the capacitor portion to the second main surface of the capacitor portion.

4. The capacitor array according to claim 3, wherein the second taper angle of the second through-portion is smaller than the first taper angle of the first through-portion.

5. The capacitor array according to claim 4, wherein the second width is smaller than the first width in a plane coplanar with the first main surface of the capacitor portion.

6. The capacitor array according to claim 3, wherein the second width is smaller than the first width in a plane coplanar with the first main surface of the capacitor portion.

7. The capacitor array according to claim 1,
wherein the capacitor layer further includes a second insulating portion over a surface of the first insulating portion, and
wherein the second insulating portion extends through the second through-portion and does not extend through the first through-portion.

8. The capacitor array according to claim 1, further comprising an insulating layer over a surface of the dielectric layer that is not covered by the first electrode layer or the second electrode layer and that is closer to at least one of the first main surface or the second main surface of the capacitor portion.

9. The capacitor array according to claim 1, further comprising a first through-hole conductor on at least an inner wall surface of a first through-hole extending through the capacitor portion in the thickness direction and electrically connected to the first electrode.

10. A capacitor array comprising;
a capacitor layer including a plurality of capacitor portions divided by a plurality of through-portions and arranged in a plane,
wherein the capacitor portions each include a first electrode, a second electrode, and a dielectric layer between the first electrode and the second electrode, and each of the capacitor portions having a first main surface and a second main surface that are opposite to each other in a thickness direction thereof,
wherein the plurality of through-portions include a first through-portion extending in a first direction perpendicular to the thickness direction, and a second through-portion extending in a second direction perpendicular to the thickness direction and intersecting the first direction,
wherein, in a sectional view taken in the thickness direction, the first through-portion has a first taper that has a first width decreasing from one of the first main surface of the capacitor portion and the second main surface of the capacitor portion to another one of the first main surface and the second main surface, and the second through-portion has a second taper that has a second width decreasing from one of the first main surface of the capacitor portion and the second main surface of the capacitor portion to another one of the first main surface and the second main surface,
wherein the first taper has a first taper angle that is different from a second taper angle of the second taper;
a first through-hole conductor on at least an inner wall surface of a first through-hole extending through the capacitor portion in the thickness direction and electrically connected to the first electrode; and
a second through-hole conductor on at least an inner wall surface of a second through-hole extending through the capacitor portion in the thickness direction and electrically connected to the second electrode.

11. The capacitor array according to claim 10,
wherein the capacitor layer further includes an insulating portion over at least one of the first main surface of the capacitor portion and the second main surface of the capacitor portion, and
wherein the insulating portion extends through the first through-portion and through the second through-portion.

* * * * *